United States Patent [19]

Yamamoto et al.

[11] Patent Number: 5,459,199
[45] Date of Patent: Oct. 17, 1995

[54] PROCESS FOR PRODUCING GRAFT POLYMER

[75] Inventors: Keisaku Yamamoto, Ichihara; Yoshio Tanimoto, Sakura; Kiyosi Ikeda; Nobuhiro Natsuyama, both of Ichihara, all of Japan

[73] Assignee: Sumitomo Chemical Company, Limited, Osaka, Japan

[21] Appl. No.: 124,218

[22] Filed: Sep. 21, 1993

Related U.S. Application Data

[62] Division of Ser. No. 834,623, Feb. 12, 1992, Pat. No. 5,274,042.

[30] Foreign Application Priority Data

| Feb. 13, 1991 | [JP] | Japan | 3-019757 |
| Jul. 1, 1991 | [JP] | Japan | 3-160474 |
| Nov. 18, 1991 | [JP] | Japan | 3-300971 |

[51] Int. Cl.$^6$ ............. C08L 9/06; C08L 23/34; C08L 27/12; C08L 23/12; C08L 83/04
[52] U.S. Cl. ............ 525/104; 525/200; 525/199; 525/198; 525/197; 525/192
[58] Field of Search ............. 525/199, 200, 525/209, 104, 72, 129, 189, 192, 197, 198

[56] References Cited

U.S. PATENT DOCUMENTS

| 3,562,195 | 2/1971 | Reiner et al. | 525/199 |
| 4,158,678 | 6/1979 | Tatemoto et al. | 525/276 |
| 4,251,399 | 2/1981 | Tomoda et al. | 525/199 |
| 4,260,698 | 4/1981 | Tatemoto et al. | 525/199 |
| 4,279,808 | 7/1981 | Hornbaker et al. | 525/72 |
| 4,487,882 | 12/1984 | Ueta et al. | 525/276 |
| 4,931,499 | 6/1990 | Sakai et al. | 525/199 |
| 5,274,042 | 12/1993 | Yamamoto et al. | 525/199 |

FOREIGN PATENT DOCUMENTS

| 0172645 | 2/1986 | European Pat. Off. . |
| 0262808 | 4/1988 | European Pat. Off. . |
| 1097997 | 1/1968 | United Kingdom . |

*Primary Examiner*—Carman J. Seccuro, Jr.
*Attorney, Agent, or Firm*—Stevens, Davis, Miller & Mosher

[57] ABSTRACT

A graft polymer wherein an iodine-containing fluororubber has been grafted on an ethylene-α-olefin copolymer or other polymer can be obtained by mixing 30 parts by weight of an iodine-containing fluororubber (a vinylidene fluoride-hexafluoropropylene copolymer containing iodine) and 70 parts by weight of an ethylene-propylene copolymer rubber at 180° C. for 30 minutes while applying shear deformation using a Brabender mixer.

5 Claims, No Drawings

PROCESS FOR PRODUCING GRAFT POLYMER

This is a division of application Ser. No. 07/834,623, filed Feb. 12, 1992, now U.S. Pat. No. 5,274,042.

The present invention relates to a process for producing a graft polymer.

Known processes for the production of graft polymer include a process wherein graft polymerization is conducted in the presence of a radical-generating agent such as peroxide or the like. This process, however, has drawbacks that undesirable degradation of polymer takes place and gelation is caused.

Japanese Patent Application Kokai No. 64-69647 discloses a process which comprises dissolving a fluororubber and an ethylene-α-olefin copolymer rubber in a solvent, reemulsifying the resulting solution, and subjecting the resulting latex to partial crosslinking with an organic oxide. This process, however, requires complicated steps of dissolution of rubbers, reemulsification, solvent removal and partial crosslinking of latex and is disadvantageous in the energy required. Thus, the process has problems in industrial application.

Japanese Patent Application Kokai No. 1-135851 discloses a process for obtaining a rubber composition by mixing a fluororubber and an ethylene-α-olefin copolymer rubber in the presence of a crosslinking agent (a peroxide) for ethylene-α-olefin copolymer rubber while applying shear deformation. This process, however, has a drawback that gelation is caused.

It has heretofore been considered that in conducting grafting, the use of a crosslinking agent such as a peroxide or the like is essential. However, when a peroxide or the like is used there is a problem that a gel is formed.

Under such circumstances, the present inventors have made extensive research on solving the above problem. As a result, they have found contrary to the prior common knowledge that a graft polymer can be obtained efficiently without causing gelation when a specific polymer, i.e. an iodine- and/or bromine-containing polymer is used as an essential constitutive polymer without using a crosslinking agent such as a peroxide or the like and said polymer and other constitutive polymer are mixed in the specific temperature range of 130°–300° C. while shear deformation is applied thereto.

According to the present invention, there is provided a process for producing a graft polymer, which comprises mixing two or more constitutive polymers to be grafted, at least one of the constitutive polymers being an iodine- and/or bromine-containing polymer, in the absence of any peroxide in the temperature range of 130°– 300° C. while applying shear deformation.

The present invention is hereinafter described in detail.

In the present invention, the iodine- and/or bromine-containing polymer to be grafted is a polymer containing iodine and/or bromine at the end(s) of its molecular chain and/or in its molecular chain, and the polymers may be rubbery or resinous.

Said rubbery polymer containing iodine and/or bromine includes, for example, a fluororubber, an isoprene rubber, a butadiene rubber, a styrene-butadiene copolymer rubber, an acrylonitrile-butadiene copolymer rubber, a butyl rubber, acrylic rubbers (e.g. acrylic rubber, ethylene-acrylate copolymer rubbers, ethylene-vinyl acetate-acrylate copolymer rubbers), ethylene-α -olefin copolymer rubbers, an ethylene-vinyl acetate copolymer rubber, a urethane rubber, a polysulfide rubber, a silicone rubber, etc., all containing iodine and/or bromine. It also includes copolymers obtained by copolymerizing one of said rubbers containing iodine and/or bromine with acrylic acid, methacrylic acid, maleic acid, itaconic acid, allyl glycidyl ether or the like, and hydrogenation products obtained by partially or wholly hydrogenating the aliphatic conjugated diene portions of one of said rubbers and natural rubber containing iodine and/or bromine.

The resinous polymer containing iodine and/or bromine includes, for example, various polyethylenes (e.g. high-density polyethylene or the like), various copolymers composed mainly of propylene (e.g. polypropylene), an ABS resin, various styrene resins, polyamide resins, polyester resins, fluororesins, etc., all containing iodine and/or bromine.

Of the iodine and bromine in the iodine- and/or bromine-containing polymer, iodine is preferable in view of the grafting efficiency.

The total content of iodine and bromine in the iodine- and/or bromine-containing polymer is preferably 0.001–10% by weight, more preferably 0.005–5% by weight. Too low a total content results in an inferior grafting efficiency, and too high a total content tends to cause gelation.

Preferable examples of the iodine- and/or bromine-containing polymer to be grafted include an iodine-containing fluoropolymer.

The fluoropolymer includes a fluororubber, a fluororesin, a fluorine-containing thermoplastic resin, etc.

The iodine-containing fluororubber can be obtained, for example, by copolymerizing vinylidene fluoride and at least one other fluoroolefin in the presence of a radical-generating source and a compound represented by the general formula $R_fX_n$ wherein $R_f$ is a fluorine-containing or fluorine- and chlorine-containing saturated or unsaturated hydrocarbon group, X is iodine, and n is an integer of 1 or larger, preferably 1 or 2. More particularly, the iodine-containing fluororubber can be obtained by the processes described in Japanese Patent Application Kokai No. 52-40543, No. 53-125491 and No. 63-159336. The above so-called fluororubber includes fluororubbers of vinylidene fluoride/hexafluoropropylene type, vinylidene fluoride/tetrafluoroethylene/hexafluoropropylene type, vinylidene fluoride/chlorotrifluoroethylene type, tetrafluoroethylene/propylene type, hexafluoropropylene/ethylene type, perfluoroalkyl vinyl ether (including those having a plurality of ether linkages)/olefin (e.g. tetrafluoroethylene, ethylene or the like) type, fluorosilicone type, fluorophosphazene type, etc.

In the present invention, the at least two constitutive polymers to be grafted may be selected from the above-mentioned iodine- and/or bromine-containing polymers, or may be a combination of the above iodine- and/or bromine-containing polymer(s) with a polymer other than the iodine-and/or bromine-containing polymer(s), for example, a halogen-free polymer.

The halogen-free polymer may be rubbery or resinous. The halogen-free rubber includes, for example, an isoprene rubber, a butadiene rubber, a styrene-butadiene copolymer rubber, an acrylonitrilebutadiene copolymer rubber, a butyl rubber, acrylic rubbers (e.g. acrylic rubber, ethylene-acrylate copolymer rubbers, ethylene-vinyl acetate-acrylate copolymer rubbers), ethylene-α-olefin copolymer rubbers, an ethylene-vinyl acetate copolymer rubber, a urethane rubber, a polysulfide rubber, a silicone rubber, etc. It also includes copolymers obtained by copolymerizing one of said rubbers with acrylic acid, methacrylic acid, maleic acid, itaconic acid, allyl glycidyl ether or the like and hydrogenation products obtained by partially or wholly hydrogenating the aliphatic conjugated diene portions of one of said rubbers. A natural rubber may also be used as the halogen-free rubber.

The halogen-free resin includes, for example, various polyethylenes (e.g. high-density polyethylene or the like), various copolymers composed mainly of propylene (e.g. polypropylene or the like), an ABS resin, various styrene resins, polyamide resins, polyester resins, fluororesins and the like.

When there are used, as the constitutive polymers, iodine- and/or bromine-containing polymer(s) and a polymer other than the iodine- and/or bromine-containing polymer(s), the ratio of the amounts of the two kinds of polymers used is preferably 70:30 to 5:95, more preferably 50:50 to 20:80 in terms of the weight ratio of [the iodine- and/or bromine-containing polymer(s)] : [the polymer other than the iodine- and/or bromine-containing polymer(s)]. When the ratio is larger than the above range, a part of the iodine- and/or bromine-containing polymer(s) remains without being grafted. When the ratio is smaller than the range, the grafting degree is low.

In the present invention, the temperature at which the constitutive polymers to be grafted are mixed in the absence of any peroxide while shear deformation is applied, is 130°–300° C., preferably 130°–250° C., more preferably 150°–200° C. However, when there is used, as the polymer other than the iodine- and/or bromine-containing polymer(s), a diene type rubber such as natural rubber, isoprene rubber, styrene-butadiene copolymer rubber, butadiene rubber or the like, the mixing temperature is preferably 130°–200° C., more preferably 130°–180° C. When a silicone rubber is used, the mixing temperature is preferably 200°–300° C. In any case, when the mixing temperature is too low, grafting does not proceed sufficiently and, conversely when the mixing temperature is too high, the starting polymers used are thermally degraded.

In the present invention, the mixing while applying shear deformation may be conducted by using a closed type kneader (e.g. Banbury mixer, Brabender mixer, kneader or the like), an open roll mill, an extruder, a continuous kneader or the like.

The mixing time is usually 2–60 minutes, preferably 5–50 minutes, more preferably 5–40 minutes.

In the present process, there can be added to the starting polymers in mixing them conventional compounding agents for rubbers and resins, such as reinforcing agent, filler, processing aid, plasticizer and the like which are all known in the rubber and resin industries.

To the graft polymer obtained by the present process may be added a reinforcing agent, a filler, a processing aid, a plasticizer, a crosslinking agent and a crosslinking accelerator when it is practically used.

When an iodine- and/or bromine-containing fluororubber is used as the iodine- and/or bromine-containing polymer, the resulting graft polymer retains the excellent properties of fluororubber (e.g. heat resistance, oil resistance, solvent resistance, friction resistance, slipperiness, water repellency, oil repellency and the like) and further is improved in processability (e.g. dispersion of additives, tackiness and the like) in which conventional fluororubbers are inferior. Owing to these excellent features, the graft polymer can be used in wide applications, for example, sealing materials (e.g. oil seal, packing, gasket, O ring and the like), diaphragm, hose lining, coating agent, extruded products (e.g. hose, profile and the like), calendered products (e.g. sheet and the like) and adhesives.

The present invention is hereinafter described in more detail referring to Examples. However, the Examples are by way of illustration and not by way of restriction.

EXAMPLE 1

Using a Brabender mixer, there were mixed, at 180° C. for 30 minutes, 30 parts by weight of an iodine-containing fluororubber [a vinylidene fluoride-hexafluoropropylene copolymer, a product of DAIKIN INDUSTRIES, LTD., Daiel G-902 (trade name), $ML_{1+10}100°$ C.=55] as an iodine- and/or bromine-containing constitutive polymer and 70 parts by weight of an ethylene-propylene copolymer rubber [a product of Sumitomo Chemical Co. Ltd., Esprene 201 (trade name), propylene content=53% by weight, $ML_{1+4}100°$ C.=43] as other constitutive polymer, to obtain a graft polymer.

That the above-obtained polymer was a graft polymer was confirmed by the following method.

The iodine-containing fluororubber and ethylene-propylene copolymer rubber used as well as the polymer obtained by mixing them were each measured for the amount extracted with carbon tetrachloride (extracted for 8 hours at the boiling point of (the amount is referred to hereinafter as carbon tetrachloride-extracted amount). The results were as follows.

|  | Carbon tetra-chloride-extracted amount (wt. %) |
| --- | --- |
| Iodine-containing fluororubber | 0.1 |
| Ethylene-propylene copolymer rubber | 100.0 |
| Polymer obtained | 99.1 |

The results are interpreted as follows. The iodine-containing fluororubber having a strong polarity is not extracted with non-polar carbon tetrachloride. Meanwhile, the ethylene-propylene copolymer rubber is extracted with (dissolved in) non-polar carbon tetrachloride. Therefore, the fact that the major portion (99.1 wt. %) of the obtained polymer is extracted with carbon tetrachloride, indicates that the iodine-containing fluororubber used has been grafted on the ethylene-propylene copolymer rubber, or degraded into lower molecular substances.

Next, the carbon tetrachloride-extracted portion of the polymer obtained (99.1 wt. % of the polymer obtained) was measured for infrared absorption spectrum. An absorption due to C-F stretching vibration was seen in the vicinity of 1,200 $cm^{-1}$. This fact also indicates that the iodine-containing fluororubber used has been either grafted on the ethylene-propylene copolymer rubber, or degraded into lower molecular substances.

Further, the iodine-containing fluororubber (intrinsic viscosity as measured at 35° C. in acetone= 0.34 dl/g) alone was kneaded at 180° C. for 30 minutes and then measured for intrinsic viscosity at 35° C. in acetone. The intrinsic viscosity after kneading was 0.33 dl/g which was substantially the same as the intrinsic viscosity before kneading. This fact indicates that when the iodine-containing fluororubber alone is kneaded a change, e.g. scission of molecular chain or the like is not caused in the rubber.

By synthesizing the above facts, it is appreciated that the iodine-containing fluororubber was not degraded into lower molecular substances but grafted on the ethylene-propylene copolymer rubber.

EXAMPLES 2–5 AND COMPARATIVE EXAMPLES 1–4

The same procedure as in Example 1 was repeated, except that the mixing ratio of the iodine-containing fluororubber and the ethylene-propylene copolymer rubber, the mixing temperature and the mixing time were varied as shown in Table 1. In Comparative Examples 1 and 2, an open roll mill was used in place of the Brabender mixer. The results obtained are shown in Table 1.

In each of Comparative Examples 1–4 in which the mixing temperatures were lower than the specific range of the present invention, the carbon tetrachloride-extracted amount of the polymer obtained corresponded to the amount of the ethylene-propylene copolymer rubber used (the iodine-containing fluororubber used remained as it was, without being grafted). The carbon tetrachloride-extracted portion of the polymer obtained was measured for infrared absorption spectrum, to find that the spectrum was identical with that of the ethylene-propylene copolymer rubber and there was no absorption at 1,200 cm$^{-1}$ due to C-F stretching vibration.

COMPARATIVE EXAMPLE 5

The same procedure as in Example 1 was repeated, except that a fluororubber free from iodine was used in place of the iodine-containing fluororubber of Example 1 and the mixing ratio was changed as shown in Table 1. The results obtained are shown in Table 1.

The carbon tetrachloride-extracted amount of the obtained polymer corresponded to the amount of the ethylene-propylene copolymer rubber used, and it is appreciated that no graft polymer was obtained.

COMPARATIVE EXAMPLE 6

The same procedure as in Example 1 was repeated, except that the constitutive polymers were mixed in the presence of an organic peroxide and the mixing ratio was changed as shown in Table 2.

The polymer obtained was subjected to extraction with carbon tetrachloride (for 8 hours at the boiling point of 76.5° C.). The residue obtained (i.e. the carbon tetrachloride-insoluble portion) was dried and again subjected to extraction with acetone (for 8 hours at the boiling point of 56.3° C.). The results of extraction are shown in Table 2.

The results are interpreted as follows. The iodine-containing fluororubber having a strong polarity is not extracted with (dissolved in) non-polar carbon tetrachloride. Meanwhile, the ethylene-propylene copolymer rubber is extracted with (dissolved in) nonpolar carbon tetrachloride. Further, the iodine-containing fluororubber is extracted with acetone. Therefore, the acetone-insoluble portion obtained in this test (about 50 wt. % based on the polymer obtained) is a so-called gel which is insoluble in both carbon tetrachloride and acetone, and it is appreciated that the formation of a gel is remarkable when the constitutive polymers are mixed in the presence of an organic peroxide. Incidentally, the fact that no gel is formed in the present invention using no organic peroxide, is also clear from that the carbon tetrachloride-extracted amount is substantially 100% (96 wt. % or more) in Examples 1–5.

EXAMPLES 6–15 AND COMPARATIVE EXAMPLES 7–16

The same procedure as in Example 1 was repeated, except that the kinds of polymers, the mixing temperature and the mixing time were changed as shown in Tables 3 and 4. The results obtained are shown in Tables 3 and 4. In comparative Examples 7 and 8, an open roll mill was used in place of the Brabender mixer. Lower mixing temperatures were used in Comparative Examples 9 and 12. A fluororubber free from iodine was used in place of the iodine-containing fluororubber in Comparative Examples 10–11 and 13–16.

TABLE 1

|  | Reference Example*[1] | | Example | | | | | Comparative Example | | | | |
|---|---|---|---|---|---|---|---|---|---|---|---|---|
|  | 1 | 2 | 1 | 2 | 3 | 4 | 5 | 1 | 2 | 3 | 4 | 5 |
| Mixing components |  |  |  |  |  |  |  |  |  |  |  |  |
| Polymer (A) |  |  |  |  |  |  |  |  |  |  |  |  |
| Kind | IFKM*[2] | — | IFKM | IFKM | IFKM | IFKM | IFKM | IFKM | IFKM | IFKM | IFKM | FKM*[5] |
| Amount used (parts by wt.) | 100 | — | 30 | 50 | 30 | 30 | 50 | 30 | 50 | 30 | 50 | 50 |
| Polymer (B) |  |  |  |  |  |  |  |  |  |  |  |  |
| Kind | — | EPM*[3] | EPM | EPM | EPM | EPM | EPM | EPM | EPM | EPM | EPM | EPM |
| Amount used (parts by wt.) | — | 100 | 70 | 50 | 70 | 70 | 50 | 70 | 50 | 70 | 50 | 50 |
| Mixing temperature (°C.) | — | — | 180 | 180 | 150 | 200 | 150 | 40 | 40 | 100 | 100 | 180 |
| Mixing time (minutes) | — | — | 30 | 30 | 20 | 20 | 20 | 20 | 20 | 10 | 10 | 30 |
| Carbon tetrachloride-extracted portion |  |  |  |  |  |  |  |  |  |  |  |  |
| weight % | 0.1 | 100 | 99.1 | 96.0 | 99.5 | 99.8 | 99.5 | 76.5 | 55.4 | 78.8 | 56.4 | 56.2 |

TABLE 1-continued

| | Reference Example[1] | | Example | | | | | Comparative Example | | | | |
|---|---|---|---|---|---|---|---|---|---|---|---|---|
| | 1 | 2 | 1 | 2 | 3 | 4 | 5 | 1 | 2 | 3 | 4 | 5 |
| IR spectrum[4] | Seen | Not seen | Seen | Seen | Seen | Seen | Seen | Not seen | Not seen | Not seen | Not seen | — |

Note:
[1]In each Reference Example, each constitutive polymer was used as it was for measurements without being kneaded.
[2]IFKM: a vinylidene fluoride-hexafluoropropylene copolymer containing iodine [Daiel G-902 (trade name), $ML_{1+10}100°$ C. = 55] manufactured by DAIKIN INDUSTRIES, LTD.
[3]EPM: an ethylene-propylene copolymer rubber (propylene content = 53% by weight, $ML_{1+4}100°$ C. = 43) manufactured by Sumitomo Chemical Co., Ltd.
[4]IR spectrum: Absorption at 1,200 $cm^{-1}$ due to C–F stretching vibration.
[5]FKM: a fluororubber free from iodine [Daial G-201 (trade name), $ML_{1+10}100°$ C. = 55) manufactured by DAIKIN INDUSTRIES, LTD.

TABLE 2

| | Comparative Example 6 |
|---|---|
| Mixing components | |
| Polymer (A) | |
| Kind | IFKM |
| Amount used (parts by wt.) | 50 |
| Polymer (B) | |
| Kind | EPM |
| Amount used (parts by wt.) | 50 |
| Organic peroxide[6] | |
| Amount used (parts by wt.) | 3 |
| Mixing temperature (°C.) | 180 |
| Mixing time (minutes) | 30 |
| Carbon tetrachloride-extraction residue (wt. %) | 80.8 |
| Acetone-extraction residue of carbon tetrachloride-extraction residue (gel content)[7] (wt. %) | 52.1 |

Note:
[6]Organic peroxide: 1,3-bis(tert-butylperoxyisopropyl)benzene.
[7]Acetone-extraction residue (gel content): a value obtained when the weight of the rubber used for extraction with carbon tetrachloride is taken as 100.

TABLE 3

| | Reference Example 3 | Example 6 | Comparative Example 7 | Reference Example 4 | Example 7 | Comparative Example 8 |
|---|---|---|---|---|---|---|
| Mixing components | | | | | | |
| Polymer (A) | | | | | | |
| Kind | — | IFKM | IFKM | — | IFKM | IFKM |
| Amount used (parts by wt.) | — | 30 | 30 | — | 30 | 30 |
| Polymer (B) | | | | | | |
| Kind | SBR[8] | SBR | SBR | CSM[9] | CSM | CSM |
| Amount used (parts by wt.) | 100 | 70 | 70 | 100 | 70 | 70 |
| Mixing temperature (°C.) | — | 150 | 40 | — | 180 | 40 |
| Mixing time (minutes) | — | 30 | 20 | — | 30 | 20 |
| Carbon tetrachloride-extracted portion (wt. %) | 100.0 | 97.8 | 73.5 | 100.0 | 98.5 | 69.3 |

Note:
[8]SBR: A styrene-butadiene copolymer rubber [Tufdene 1000R (trade name), styrene content = 18% by weight, $ML_{1+4}100°$ C. =45] manufactured by ASAHI CHEMICAL INDUSTRY CO., LTD.
[9]CSM: A chlorosulfonated polyethylene rubber [Hypalon 20 (trade name), chlorine content = 29% by weight, sulfur content =1.4% by weight, $ML_{1+4}100°$ C. = 45 ] manufactured by DuPont-Showa Denko Co., Ltd.

TABLE 4

|  | Reference Example 5 | Example 8 | Example 9 | Comparative Example 9 | Comparative Example 10 | Comparative Example 11 | Reference Example 6 | Example 10 | Example 11 | Comparative Example 12 |
|---|---|---|---|---|---|---|---|---|---|---|
| Mixing components |  |  |  |  |  |  |  |  |  |  |
| Polymer (A) |  |  |  |  |  |  |  |  |  |  |
| Kind | — | IFKM | IFKM | IFKM | FKM | FKM | — | IFKM | IFKM | IFKM |
| Amount used (parts by wt.) | — | 30 | 50 | 30 | 30 | 50 | — | 30 | 50 | 30 |
| Polymer (B) |  |  |  |  |  |  |  |  |  |  |
| Kind | EMA*[10] | EMA | EMA | EMA | EMA | EMA | VMQ*[11] | VMQ | VMQ | VMQ |
| Amount used (parts by wt.) | 100 | 70 | 50 | 70 | 70 | 50 | 100 | 70 | 70 | 70 |
| Mixing temperature (°C.) | — | 180 | 180 | 100 | 180 | 180 | — | 220 | 200 | 100 |
| Mixing time (minutes) | — | 30 | 30 | 10 | 30 | 30 | — | 30 | 30 | 10 |
| Carbon tetrachloride-extracted portion (wt. %) | 100.0 | 92.4 | 95.1 | 73.0 | 75.6 | 48.8 | 100.0 | 97.8 | 90.5 | 72.2 |

Note:
*[10]EMA: an ethylene-acrylate copolymer rubber [Esprene EMA2152 (trade name), acrylate content = 59% by weight, $ML_{1+4}100°$ C. = 16] manufactured by Sumitomo Chemical Co., Ltd.
*[11]VMQ: a silicone rubber composed of vinylmethylsiloxane, manufactured by Shin-Etsu Chemical Co., Ltd.

TABLE 5

|  | Reference Example 7 | Example 12 | Example 13 | Example 14 | Example 15 | Comparative Example 13 | Comparative Example 14 | Comparative Example 15 | Comparative Example 16 |
|---|---|---|---|---|---|---|---|---|---|
| Mixing components |  |  |  |  |  |  |  |  |  |
| Polymer (A) |  |  |  |  |  |  |  |  |  |
| Kind | — | IFKM | IFKM | IFKM | IFKM | FKM | FKM | FKM | FKM |
| Amount used (parts by wt.) | — | 30 | 30 | 50 | 50 | 30 | 30 | 50 | 50 |
| Polymer (B) |  |  |  |  |  |  |  |  |  |
| Kind | PP*[12] | PP | PP | PP | PP | PP | PP | PP | PP |
| Amount used (parts by wt.) | 100 | 70 | 70 | 50 | 50 | 70 | 70 | 50 | 50 |
| Mixing temperature (°C.) | — | 200 | 180 | 200 | 180 | 200 | 180 | 200 | 180 |
| Mixing time (minutes) | — | 30 | 30 | 30 | 30 | 30 | 30 | 30 | 30 |
| Carbon tetrachloride-extracted portion (wt. %) | 100.0 | 97.0 | 99.0 | 93.0 | 87.0 | 78.0 | 78.0 | 55.0 | 54.0 |

Note:
*[12]PP: a polypropylene [Noblen H-501 (trade name)] manufactured by Sumitomo Chemical Co., Ltd.

What is claimed is:

1. A process for producing a graft polymer consisting essentially of mixing two constitutive polymers to be grafted in the absence of any peroxide or cross-linkers in the temperature range of 130°–300° C. while applying shear deformation, wherein one constitutive polymer is an iodine-containing fluoro-rubber containing 0.001–10% by weight of iodine, the other constitutive polymer is selected from the group consisting of a styrene-butadiene copolymer rubber, a chlorosulfonated polyethylene rubber, acrylic rubbers, a silicone rubber and a polypropylene, the weight ratio of the iodine-containing fluoro-rubber and the other constitutive polymer is 70:30 to 5:95, the mixing is conducted by using a closed type kneader, and the mixing time is 2–60 minutes.

2. A process according to claim 1 wherein said other constitutive polymer is a styrene-butadiene copolymer rubber and said temperature range is 130°–200° C.

3. A process according to claim 1 wherein said other constitutive polymer is a silicone rubber and said temperature range is 200°–300° C.

4. A process according to claim 1, wherein the iodine-containing fluoro-rubber to be grafted is a polymer containing iodine at the end(s) of its molecular chain and/or in its molecular chain.

5. A process according to claim 1, wherein the mixing is conducted by using a Brabender mixer.

* * * * *